(12) United States Patent
Ogami

(10) Patent No.: US 6,950,858 B2
(45) Date of Patent: Sep. 27, 2005

(54) METHOD OF CHANGING AND DELIVERING PERSONAL INFORMATION, AND PERSONAL INFORMATION CHANGE AND DELIVERY SYSTEM

(75) Inventor: Motoya Ogami, Tokyo (JP)

(73) Assignee: Internet Research Institute, Inc., Tokyo (JP)

( * ) Notice: Subject to any disclaimer, the term of this patent is extended or adjusted under 35 U.S.C. 154(b) by 782 days.

(21) Appl. No.: 09/794,585

(22) Filed: Feb. 27, 2001

(65) Prior Publication Data

US 2001/0021946 A1 Sep. 13, 2001

(30) Foreign Application Priority Data

Mar. 2, 2000 (JP) ...................................... 2000-057523

(51) Int. Cl.$^7$ ............................................. G06F 15/16
(52) U.S. Cl. ..................................................... 709/217
(58) Field of Search ............................... 709/202, 203, 709/217

(56) References Cited

U.S. PATENT DOCUMENTS 6,643,684 B1 * 11/2003 Malkin et al. .............. 709/206

* cited by examiner

Primary Examiner—David Y. Eng
(74) Attorney, Agent, or Firm—Reed Smith LLP

(57) ABSTRACT

A method of changing and distributing personal information by which efforts of both of an information contributor and a recipient are reduced and the personal information is always kept up-to-date more easily and correctly. The present method of changing and distributing personal information comprises steps of: changing concerned personal information by a personal information contributor; updating and storing the concerned personal information by a computer system linked via a computer network; and when a recipient set by the personal information contributor requests for update, delivering deliver permit items only among the concerned personal information to the recipient by the computer system.

7 Claims, 4 Drawing Sheets

PAF SETTING SCREEN DISPLAY

ID NO.: ABC123-AB

[UPDATING]

● ALL ○ NUMBER SELECTION (NO)

←— PAF SETTING AREA —→

| NO | NAME | ID NO. | TELEPHONE NO. | DELIVERY-PERMIT-ITEM | REGISTRATION MODE |
|----|------|--------|---------------|----------------------|-------------------|
|    | B4   |        | Xxxxxxxx      | ●A ○B ○C ○D          | ●1 ○2 ○3 ○NG      |
|    | B5   |        | Xxxxxxxx      | ○A ●B ○C ○D          | ●1 ○2 ○3 ○NG      |
|    | B6   |        | Xxxxxxxx      | ○A ○B ●C ○D          | ●1 ○2 ○3 ○NG      |
|    | B7   |        | Xxxxxxxx      | ○A ○B ○C ●D          | ●1 ○2 ○3 ○NG      |
|    | B8   |        | NONE          | ○A ●B ○C ○D          | ●1 ○2 ○3 ○NG      |
|    | B9   |        | Xxxxxxxx      | ○A ○B ●C ○D          | ○1 ○2 ●3 ○NG      |
|    | B10  |        | Xxxxxxxx      | ●A ○B ○C ○D          | ○1 ●2 ○3 ○NG      |
|    | B11  |        | NONE          | ●A ○B ○C ○D          | ○1 ○2 ○3 ●NG      |
|    | B12  |        | Xxxxxxxx      | ●A ○B ○C ○D          | ●1 ○2 ○3 ○NG      |
|    | B13  |        | Xxxxxxxx      | ●A ○B ○C ○D          | ●1 ○2 ○3 ○NG      |
|    | B14  |        |               | ●A ○B ○C ○D          | ●1 ○2 ○3 ○NG      |

VIEW MODE SELECTION  ● DATA BASE TYPE   ○ CARD TYPE

*FIG. 3*

METHOD OF CHANGING AND DELIVERING PERSONAL INFORMATION, AND PERSONAL INFORMATION CHANGE AND DELIVERY SYSTEM

This application claims Paris Convention priority of Japanese Application No. 2000-057523 filed Mar. 2, 2000, the complete disclosure of which is(are) hereby incorporated by reference.

BACKGROUND OF THE INVENTION

1. Field of the Invention

The present invention relates to a method of changing and delivering personal information and to a personal information change and delivery system.

2. Description of the Related Art

When some personal information including a name, an employment office, an assigned department or position within the office, an office postal address, an office telephone number, an office FAX number, an office E-mail address, a business hours mobile telephone number, a private E-mail address, a private mobile telephone number, a home telephone number, and a home postal address of a person changes, the person himself (or herself) gives multiple destinations or recipients a notice such as a marriage announcement, a change of work location notice, a change of job notice, a change of address notice or the like by postal service, by facsimile, or by E-mail. On the other hand, the respective recipients update their data records such as an address book based on the received information, or store the notification as it is. Or, after personal information has changed, the pertinent person awaits an opportunity of meeting certain recipients (i.e. individuals who need to be informed), and when such an opportunity arises, then provides the respective recipients with his or her visiting card having thereon the new personal information printed, while the recipients similarly update their data records including an address book or store the visiting card.

In the case mentioned above, however, each of the recipients has to update their own data records such as an address book, which is very burdensome. Particularly, such personal information stored in, application software including a spread sheet program, an internet browser, a mailer, and a postal address printing software in a personal computer of these recipients and the relevant telephone number stored in a mobile telephone must be all updated to digitize them by the individual recipients by manually entering the received information. These tasks are very tiresome and the recipients tend to make a typing error, and may sometimes forget to update to new information contents.

In addition, a personal information contributor (i.e., a person of the information source) has to send a notice about a change of personal information to every one of multiple recipients. Such a task is very troublesome and often induces a mistake. For example, in the case of transference to a new work location, the relevant person has to prepare two types of notices, one of which notifies about a change of work location only and the other of which notifies about various changes including a change of postal address, and then send one or both of them depending on the individual recipients. Thus the personal information contributor has to expend enormous efforts, thereby errors are apt to occur.

That is, according to the conventional procedures as mentioned above, it is difficult to always keep personal information up-to-date and it is not uncommon that contact with someone is lost.

It is predicted that, in a future society, persons who belong to a single company or organization until their retirement age will reduce, and the occupation changes of so-called currently active working persons will increase. Therefore, the occasion required to change personal information data will more frequently arises. Accordingly, in order to maintain the personal information up-to-date with the conventional procedures, both of the information contributor and the recipients must expend enormous efforts and further pay special attention to avoid mistakes.

SUMMARY OF THE INVENTION

Accordingly, it is an object of the present invention to provide a method of changing and distributing private information by which efforts of both of an information contributor and a recipient are reduced and the private information is always kept up-to-date more easily and correctly.

The forgoing object is achieved by a method of changing and delivering personal information in accordance with a first aspect of the present invention, comprising steps of: changing concerned personal information by a personal information contributor; updating and storing the concerned personal information by a computer system linked via a computer network; and when a recipient set by the personal information contributor requests for update, delivering only deliver-permit-items among the concerned personal information to the recipient by the computer system.

The forgoing object is also achieved by a personal information change and delivery system in accordance with a second aspect of the present invention comprising a host computer, including: a first memory part for storing a name and associated personal information of a personal information contributor in a personal information area so as to permit updating of the contents thereof and storing recipients to be supplied with the relevant personal information in a recipient list so as to permit updating of the contents thereof; an access gate for, when receiving through a communication line a request from the personal information contributor for a change of the associated personal information or for a change of recipients, verifying the identity of the requesting contributor, and if not legitimate, then breaking down communications, while if legitimate, then receiving the changed data about the personal information or recipients from the personal information contributor, and updating the data contents of the personal information area or recipient list; a user access gate for, when a request for update of the personal information is received from one of the recipient, verifying the identity of the recipient, and if not legitimate, then breaking down communications, while if legitimate, then supplying a personal access filter with the information about the recipient; and a personal access filter for, on the one hand, when a request for change of delivery-permit-items among the concerned personal information is received from the personal information contributor through a communication line, verifying the identity of the contributor, and if not legitimate, then breaking down communications, while if legitimate, then receiving the changed data of the delivery-permit-items among the concerned personal information, then updating the delivery-permit-items among the concerned personal information in the second memory part, and on the other hand, when the recipient information supplied from the user access gate is received, searching the recipient list in the first memory part, and if the relevant recipient is contained therein, then extracting the corresponding information from the first memory part, and delivering to the recipient the deliverypermit-items only for the recipient among the extracted personal information.

In accordance with the personal information change and delivery system of the present invention, a recipient can update very simply and correctly certain personal information to the newest contents at all times, because the personal information is automatically updated to the newest contents after the identity of the recipient is verified, simply by accessing to the personal information change and delivery system and selecting "Updating Personal Information". That is, the system of the present invention is a pull media type system wherein the information is not updated to the newest contents until the recipient takes positive action for update.

Further, in accordance with the personal information change and delivery system of the present invention, a personal information contributor is allowed to select and change the personal information contents, registration mode, delivery-permit-items for each recipient, therefore the personal information contributor can grasp actual conditions and more easily and rapidly react in response to change of a situation.

Besides, in the preferred embodiment of the present invention, personal information is converted into the data format suited for particular application software and then delivered thereto, whereby efforts of the recipient are reduced and the relevant data contained in respective application software are also updated to the newest contents at the same time, thus it is ensured to maintain communications with the information contributor based on such application software.

BRIEF DESCRIPTION OF THE DRAWINGS

FIG. 3 is a schematic view showing an embodiment of a screen display for setting recipients, delivery-permit-items, etc.

DESCRIPTION OF THE PREFERRED EMBODIMENTS

In the following, the present invention will be specifically described with reference to the accompanying drawings.

Figure 1:
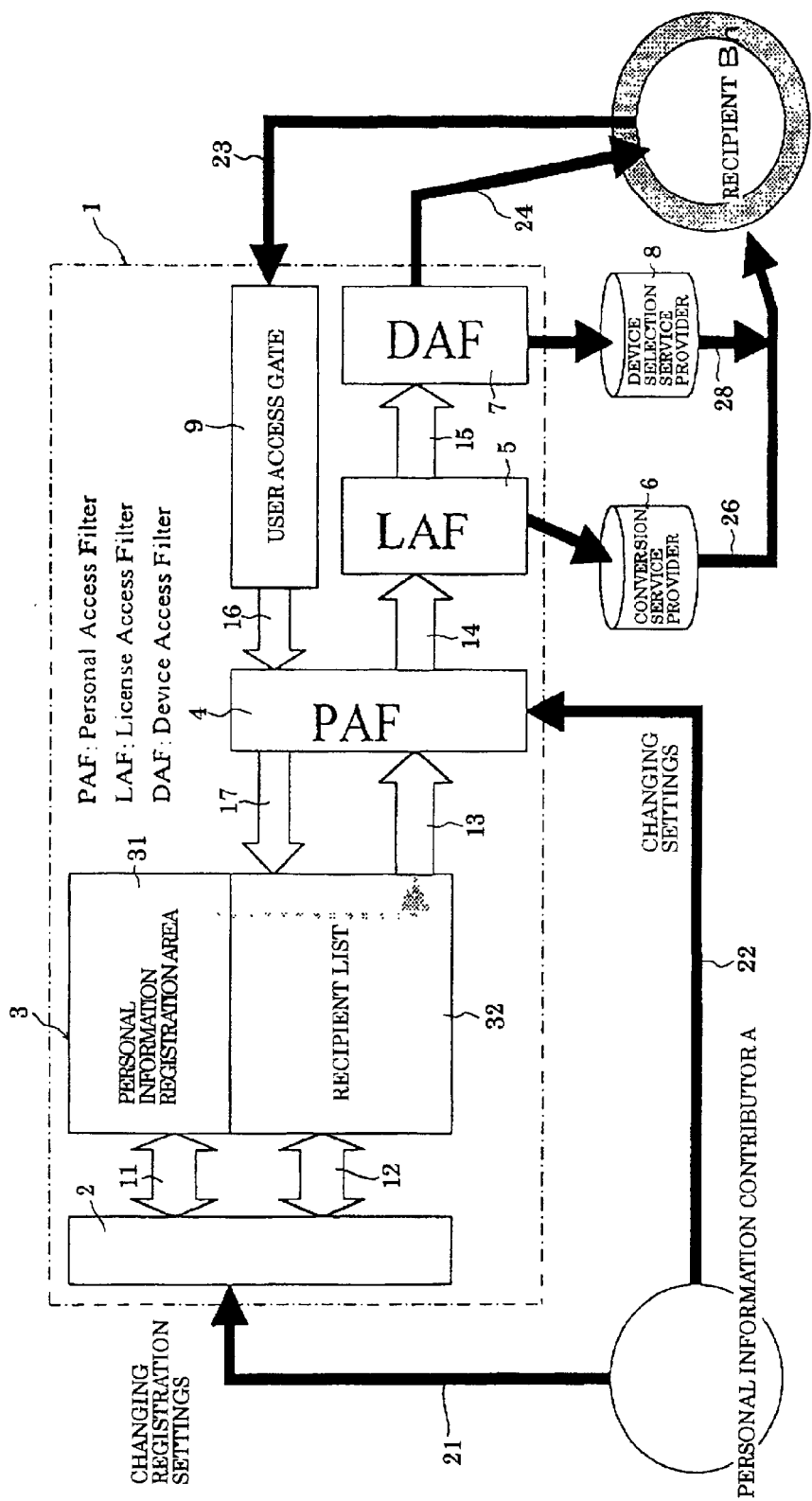
FIG. 1 is a schematic view showing an embodiment of a personal information change and delivery system according to the present invention.

FIG. 1 is a schematic view of a personal information change and delivery system according to an embodiment of the present invention.

A personal information contributor A has already registered his or her own personal information and recipients, and such data have been stored in a personal information area 31 and recipient list 32 in a first memory part 3 of a computer system. The procedures for registering the personal information contributor A, the personal information of A, and the recipients thereof are described later herein.

A personal information change and delivery system 1 according to the present embodiment comprises an access gate 2, a first memory part 3, a personal access filter (hereinafter referred to as "PAF") 4, a license access filter (hereinafter referred to as "LAF") 5, a device access filter (hereinafter referred to as "DAF") 7, and a user access gate 9. The first memory part 3 is divided into the personal information area 31 and the recipient list 32. These components are interconnected through bidirectional information transfer paths 11 and 12 and unidirectional information transfer paths 13 to 17.

Both of the access gate 2 and the PAF 4 in the present embodiment of the personal information change and deliver system 1 are connected to the personal information contributor A so as to allow for communications therebetween through computer networking lines 21 and 22, respectively. Besides, the user access gate 9 and DAF 7 in the personal information change and deliver system 1 are connected to an n-th recipient Bn (n is an integer) so as to allow for communications therebetween through computer networking lines 23 and 24, respectively. Further, information from the LAF 5 in the personal information change and deliver system 1 is transferred to a line 25, a data conversion service provider 6, and a line 26 in that order, and finally reaches the n-th recipient Bn. Still further, information from the DAF 7 in the personal information change and deliver system 1 is transferred to a line 27, a device selection service provider 8, and a line 28 in that order, and finally reaches the n-th receiver Bn. Lines used for networking computers include wire telephone lines, cables for cable televisions, optical fibers, electric wires, and radio links.

Next, the method of using the personal information change and delivery system according to the present embodiment shown in FIG. 1 will be described.

(Registering Personal Information)

(Step R1) An arbitrary person accesses the personal information change and delivery system of the present invention via a computer network and selects "Registering Personal Information". Then the personal information change and delivery system assign an ID number and a password to the person and register the person as a personal information contributor A.

(Step R2) Next, the personal information contributor A enters his or her own personal information in a secure (safety) WEB accessing state.

Figure 2:
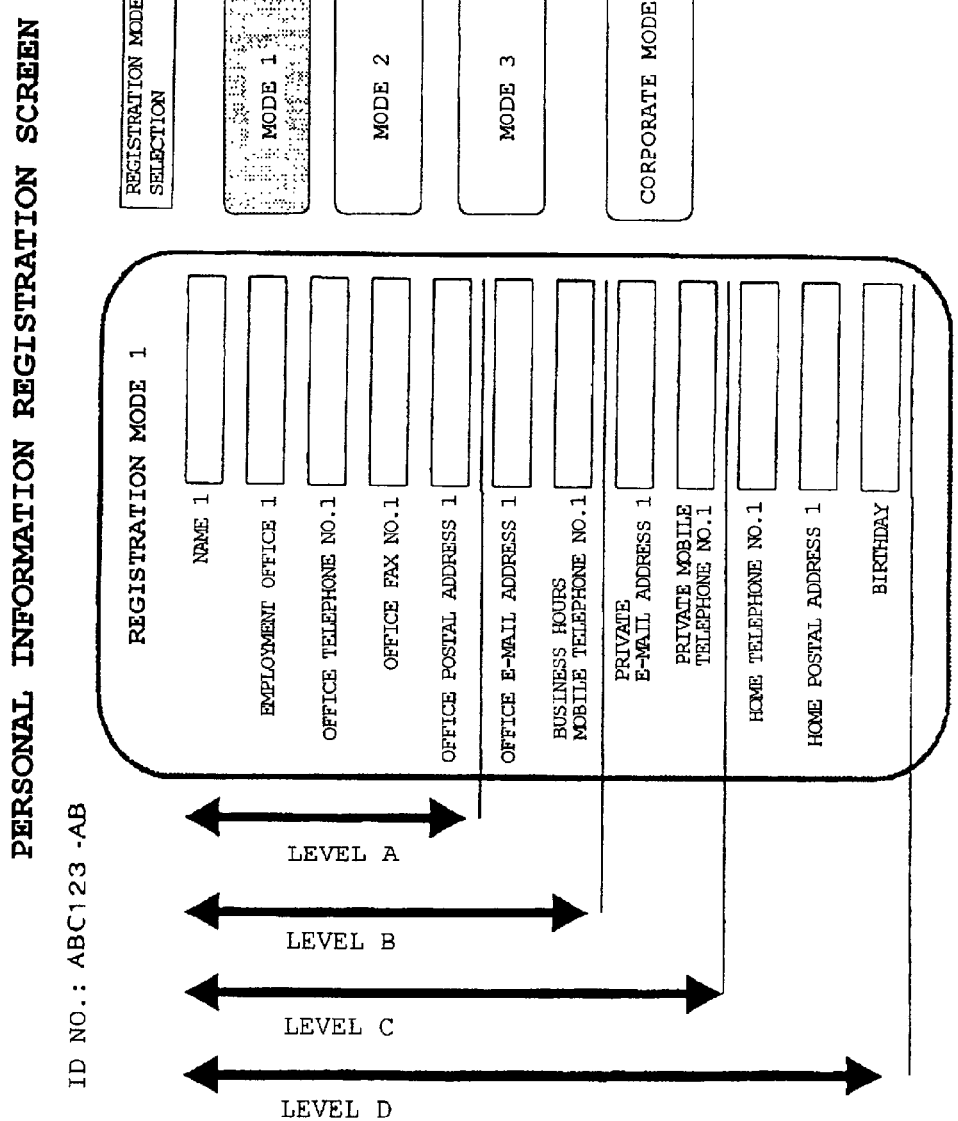
FIG. 2 is a schematic view showing an embodiment of a screen display for registering and changing personal information.

FIG. 2 is a schematic view showing an embodiment of a screen display for registering and changing personal information. In this case, three registration modes are provided, and up to three different personal information are allowed to be registered for each person. For example, a person who holds two occupational positions concurrently in two companies can register independently the personal information in two official registration modes and one private registration mode. Alternatively, personal information may be registered independently in three official registration modes for example, in Japanese, English, and Chinese. For each registration mode, a personal name, an employment office, an assigned department or position within the office, an office postal address, an office telephone number, an office FAX number, an office http (the foregoing are classified in Level A delivery-permit-items), an office E-mail address, a business hours mobile telephone number (the foregoing are classified in Level B delivery-permit-items), a private http, a private E-mail address, a private mobile telephone number (the foregoing are classified in Level C delivery-permit-items), a home telephone number, a home FAX number, a home postal address, a birthday (the foregoing are classified in Level D delivery-permit-items) are entered. As the other personal information, fields for a sign of the Chinese zodiac, a sign of the European zodiac, a blood type, today's after-five schedule and the like may be added.

(Step R3) After that, the personal information contributor A enters recipients of the relevant personal information and then selects registration mode and delivery-permit-items for each of the recipients in a secure (safety) WEB accessing state.

FIG. 3 is a schematic view showing an embodiment of a screen display for setting recipients, delivery-permit-items, etc. The screen display can be switched between an at-a-glance display (ALL) and a specified number item display (NO) for each information contributor. Besides, a view mode may be selected from a data base type and a card type. In FIG. 3, the at-a-glance display and the data base type view are selected. Each recipient is assigned to each row wherein the data concerning NO, name, ID number, telephone number, delivery-permit-items, and registration mode of the recipient can be seen. NO is a counter and automatically supplied with an integer. The personal information contributor enters a name, an ID number, and, if necessary, a telephone number of the recipient. Then the personal information contributor selects to activate one of the delivery-permit-item levels A to D. Further, the contributor selects to activate one of the registration modes 1, 2, 3, and NG. The NG is used for canceling the delivery at a later time after registration of the recipient.

Here, initial setting or default of the delivery-permit-item is Level A, and registration mode is 1.

(Changing Personal Information)

(Step C1) The personal information contributor A accesses the personal information change and delivery system of the present invention via the computer network and selects "Changing Personal Information". Then the personal information change and delivery system requests the contributor A to enter the ID number and password. The system verifies the ID number and password entered by the personal information contributor A, and if they are legitimate, the access gate is opened and the system branches to Step C2, while if they are not legitimate, the system requests the contributor A to enter the ID number and password again.

(Step C2) The personal information change and delivery system transmits the personal information of the personal information contributor A corresponding to the ID number to the personal information contributor A in a secure (safety) WEB accessing state, and then the personal information contributor A enters the changed personal information in the secure (safety) WEB accessing state.

(Step C3) If desired, in the secure (safety) WEB accessing state, the system transmits the personal information contributor A the recipient list corresponding thereto, and then the personal information contributor A enters the changed recipient list and changes the registration mode and delivery-permit-item for each of the recipients, and sends back the resultant data.

(Updating Personal Information)

(Step U1) The recipient Bn accesses the personal information change and delivery system of the present invention via a computer network and selects "Updating Registering Personal Information". Then the personal information change and delivery system requests the recipient Bn to enter the ID number and password. The system verifies the ID number and password entered by the recipient Bn, and if they are legitimate, the user access gate is opened and the system branches to Step U2, while if they are not legitimate, the system requests the recipient Bn to enter the ID number and password again.

(Step U2) The system searches the recipient list containing the recipient Bn corresponding to the ID number and password from the first memory part, extracts and send to the PAF the personal information of the personal information contributor A corresponding to this recipient list, extracts the delivery-permit-items and registration mode of the recipient Bn, and then automatically sets the PAF. As a result, the preset delivery-permit-items under the preset registration mode for the personal information of the personal information contributor A passes the PAF and transmitted to the recipient Bn, and the personal information of the personal information contributor A are updated to the newest data within the computer of the recipient Bn.

(Step U3) In addition, when such personal information are stored in special-purpose application software and the application software has been previously approved by the LAF, the data format of the received personal information is automatically converted and updated to the newest contents suited for this application software.

(Step U4) Further, if the software was contracted and approved in advance by the DAF, telephone numbers stored in a mobile telephone, mobile data terminal equipment, a digital television receiver, or a household electrical communications appliance are also updated to the newest 2 contents.

(Verifying New Recipient)

(Step N1) The personal information contributor A informs a new recipient X of an ID number by writing on a visiting card or by facsimile.

(Step N2) The personal information contributor A changes the recipient list of Step C3 by adding the ID number and the new recipient X thereto.

(Step N3) The new recipient X accesses the personal information change and delivery system of the present invention a few days later via the computer network and selects "Registering New Recipient". Then the personal information change and delivery system requests the new recipient X to enter the ID number and password. The system verifies the ID number and password entered by the new recipient X, and if they are legitimate, the system assigns a password to the new recipient X and goes to step N4, while if they are not legitimate, the system requests the new recipient X to enter the ID number and password again.

(Step N4) The personal information change and delivery system informs the personal information contributor A of the completion of the registration process of the new recipient X along with its ID number and name by E-mail or the like.

(Step N5) When rejecting the delivery of the personal information thereto, the personal information contributor A changes the registration mode by selecting "NG" for the registration mode of the relevant recipient X in Step C3 within several days. At other times, the new recipient becomes possible to update the personal information of the personal information contributor A through Steps U1 to U4 after several days.

Thus, while the present invention has been described such that a personal information contributor provides his or her own personal information, it is also within the scope of the present invention that a single personal information contributor is a name list manager of an alumni association and deals with a long list of personal information of the members of the alumni association so as to centrally manage and change the personal information thereof and provide such information to all of the members.

Figure 4:
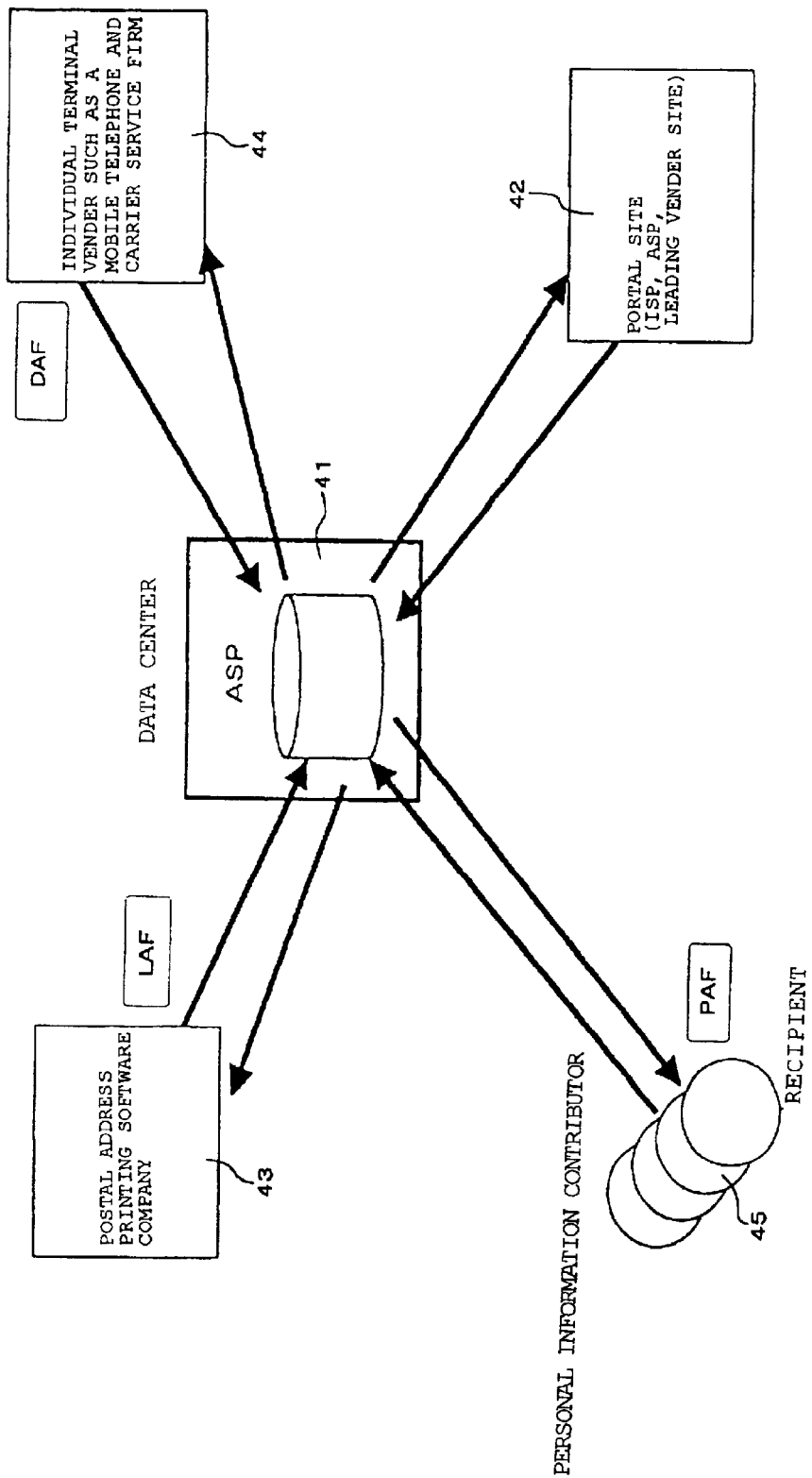
FIG. 4 is a schematic view showing an application of the personal information change and delivery system of the present invention.

FIG. 4 is a schematic view showing an application of the personal information change and delivery system of the present invention.

The personal information change and delivery system of the present invention is configured as a computer of a data center 41 of an ASP (application service provider) and linked with a computer of a site 42 of an ISP (internet service provider) or an ASP (application service provider), and accordingly a person who accesses the site can use this system.

The data center 41 of the ASP is liked with a computer of application software via the LAF, and personal information is converted to a data format suited for the contracted application software.

The data center 41 of the ASP is also liked with a computer of an individual terminal vender such as a mobile telephone and a computer of a carrier service firm or a carrier 44 via the DAF, thereby data such as telephone numbers stored in a contracted mobile telephone, mobile data terminal equipment, digital television receiver, game machine, or household electrical communications appliance are updated to the newest contents in response to a change of personal information.

Of course, the computers of the personal information contributor and recipient 45 are connected to the data center of the ASP via the PAF. In ordinary cases, such connections are automatically established after the personal information contributor or recipient 45 accesses the site 42 of the ISP or ASP.

What is claimed is:

1. A method of changing and delivering personal data, comprising steps of:

receiving changes to concerned personal data from a personal data contributor;

updating and storing the concerned personal data by a computer system linked via a computer network according to the received changes, and when a request for the updated personal data is received from a recipient among a plurality of recipients set by the personal data contributor, delivering only deliver-permit-items among the concerned personal data items to the recipient by the computer system, the deliver-permit-items being set by the personal data contributor and defining which items of the personal data are to be delivered based on the recipient;

receiving from the recipient a selection of an application software which requires conversion of the data format of the personal data to be delivered;

converting the personal data to be delivered to the recipient into a target format of the selected application software; and then delivering the converted personal data to the recipient by the computer system.

2. A method of changing and delivering personal data according to claim 1, further comprising steps of:

receiving from the recipient a selection of an information processor to which the delivered personal data is further delivered;

storing the received selection of the information processor, converting the personal data delivered to the recipient into the data suited to the selected information processor, and delivering to the selected information processor the converted personal data by the computer system.

3. A method of changing and delivering personal data, comprising steps of:

receiving changes to concerned personal data from a personal data contributor;

updating and storing the concerned personal data by a computer system linked via a computer network according to the received changes;

wherein when a request for the undated personal data is received from a recipient among a plurality of recipients set by the personal data contributor, delivering only deliver-permit-items among the concerned personal data items to the recipient by the computer system, the deliver-permit-items being set by the personal data contributor and defining which items of the personal data are to be delivered based on the recipient, receiving from the recipient a selection of an information processor to which the delivered personal data is further delivered;

storing the received selection of the information processor, and converting the personal data delivered to the recipient into the data suited to the selected information processor, and delivering to the selected information processor the converted personal data by the computer system.

4. A personal data change and delivery system comprising a host computer, said computer including:

a first memory part for storing an identification data of a personal data contributor and personal data concerned thereto and storing data of recipients and delivery permit items thereof, the delivery permit items being set by the personal data contributor and defining which items of the personal data are to be delivered based on the recipients;

an access gate for, when receiving through a communication line a request from the personal data contributor for a change of the associated personal data or for a change of recipients, verifying the identity of the personal data contributor, and if not legitimate, then breaking down communications, while if legitimate, then receiving the changed personal data or recipients from the personal data contributor, and updating the data contents of the personal data or recipient list;

a user access gate for, when a request for update of the personal data is received from one of the recipients, verifying the identity of the recipient, and if not legitimate, then breaking down communications, while if legitimate, then supplying a personal access filter with the data about the recipient; and a personal access filter for, on the one hand, when a request for change of delivery-permit-items among the concerned personal data is received from the personal data contributor through a communication line, verifying the identity of the contributor, and if not legitimate, then breaking down communications, while if legitimate, then receiving the changed data of the delivery-permit-items among the concerned personal data, then updating the delivery-permit-items among the concerned personal data in the first memory part, and on the other hand, when the recipient data supplied from the user access gate is received, searching the recipient list in the first memory part, and if the relevant recipient is contained therein, then extracting the corresponding data from the first memory part, and delivering to the recipient only the delivery-permit-items for the recipient among the extracted personal data.

5. A personal data change and delivery system according to claim 4, wherein said host computer further includes a license access filter for storing data about application software for which the recipient designates data conversion, converting the delivery-permit-items among the personal data supplied from the personal access filter into the data format of the application software, and delivering the converted data to the recipient.

6. A personal data change and delivery system according to claim 5, wherein said host computer further includes a device access filter for storing data about an information processor selected by the recipient, converting the data of the delivery-permit-items among the personal data supplied from the personal access filter into the data format of the selected information processor, and delivering the converted data to the information processor.

7. A personal data change and delivery system according to claim 4, wherein said host computer further includes a device access filter for storing data about an information processor selected by the recipient, converting the data of the delivery-permit-items among the personal data supplied from the personal access filter into the data format of the information processor, and delivering the converted data to the information processor.

* * * * *